US008648282B2

(12) United States Patent
Garcia (10) Patent No.: US 8,648,282 B2
(45) Date of Patent: Feb. 11, 2014

(54) COOKING APPARATUS AND METHOD (75) Inventor: Jorge Garcia, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 1079 days.

(21) Appl. No.: 12/500,430

(22) Filed: Jul. 9, 2009

(65) Prior Publication Data
US 2011/0006054 A1 Jan. 13, 2011

(51) Int. Cl.
A47J 27/00 (2006.01)
A47J 27/02 (2006.01)
A47J 36/10 (2006.01)
B65D 45/04 (2006.01)
B65D 45/06 (2006.01)

(52) U.S. Cl.
USPC ........ 219/432; 219/433; 220/573.4; 220/318; 220/322; 220/324; 220/326

(58) Field of Classification Search
None
See application file for complete search history.

(56) References Cited

U.S. PATENT DOCUMENTS

| 3,609,297 | A | * | 9/1971 | Christopoulos | 219/439 |
| 3,674,981 | A | * | 7/1972 | Pickard | 219/401 |
| 3,769,899 | A | * | 11/1973 | Kostko | 99/324 |
| 4,158,126 | A | * | 6/1979 | Seitz | 219/439 |
| 4,591,698 | A | | 5/1986 | Chang | |
| 4,629,866 | A | * | 12/1986 | Proctor | 219/439 |
| 4,903,753 | A | * | 2/1990 | Golz | 164/493 |
| 5,065,885 | A | * | 11/1991 | Scaroni | 220/326 |
| 5,317,959 | A | * | 6/1994 | Beluzzi | 99/337 |
| 5,452,683 | A | * | 9/1995 | Poffenroth | 119/73 |
| 5,466,603 | A | * | 11/1995 | Meehan et al. | 435/285.1 |
| 5,553,531 | A | * | 9/1996 | Brown | 99/340 |
| 5,850,503 | A | * | 12/1998 | Onken | 392/441 |
| 5,908,551 | A | * | 6/1999 | Onken | 210/184 |
| 5,964,145 | A | * | 10/1999 | Brown | 99/422 |
| D429,596 | S | | 8/2000 | Hlava et al. | |
| 6,102,238 | A | | 8/2000 | Brady et al. | |
| 6,116,452 | A | * | 9/2000 | Hamel et al. | 220/318 |
| 6,274,847 | B1 | | 8/2001 | Hlava et al. | |
| 6,283,014 | B1 | * | 9/2001 | Ng et al. | 99/330 |
| 6,450,361 | B1 | * | 9/2002 | Mendelson et al. | 220/573.1 |
| 6,498,323 | B1 | | 12/2002 | Robertson, Jr. et al. | |
| 6,565,903 | B2 | | 5/2003 | Ng et al. | |
| 6,573,483 | B1 | | 6/2003 | DeCobert et al. | |
| 6,587,739 | B1 | | 7/2003 | Abrams et al. | |
| 6,740,855 | B1 | | 5/2004 | DeCobert et al. | |
| 6,824,004 | B1 | * | 11/2004 | Wooderson | 220/318 |

(Continued)

OTHER PUBLICATIONS

International Search Report for PCT/US2010/041505 (Sep. 1, 2010).

(Continued)

Primary Examiner — Joseph M Pelham
(74) Attorney, Agent, or Firm — Baker & Hostetler LLP (57) ABSTRACT A cooking apparatus and method of assembling the same includes an outer shell including a base, a heating element positioned inside the outer shell, and a thermally conducting liner removably located inside the outer shell over the heating element. The liner includes an annular flange, and a first integral handle including a first latch. The apparatus and method further includes a lid configured to be placed over the liner, the lid including a sealing ring at an outer edge of the lid, and a top surface, wherein the first latch is configured to contact the top surface of the lid to secure the lid to the annular flange of the liner.

33 Claims, 9 Drawing Sheets

(56) References Cited

U.S. PATENT DOCUMENTS

| | | | |
|---|---|---|---|
| 6,872,921 B1 | 3/2005 | DeCobert et al. | |
| 6,987,247 B2 | 1/2006 | Schaffeld et al. | |
| D528,353 S | 9/2006 | Brady et al. | |
| 7,109,445 B2 | 9/2006 | Patterson et al. | |
| 7,141,764 B1 * | 11/2006 | Shumate | 219/430 |
| 7,291,812 B2 | 11/2007 | Kaney et al. | |
| 7,312,425 B2 | 12/2007 | DeCobert et al. | |
| D568,676 S | 5/2008 | Steiner et al. | |
| 7,485,831 B2 * | 2/2009 | Tynes et al. | 219/433 |
| 7,726,234 B2 * | 6/2010 | Glier | 99/348 |
| 7,820,947 B2 * | 10/2010 | Gaynor et al. | 219/442 |
| 7,947,928 B2 * | 5/2011 | Tynes et al. | 219/433 |
| 8,109,201 B2 * | 2/2012 | Schandel et al. | 99/340 |
| 2007/0210061 A1 | 9/2007 | Tynes et al. | |
| 2007/0210062 A1 | 9/2007 | Gaynor et al. | |
| 2007/0221651 A1 | 9/2007 | Kristina et al. | |
| 2007/0256571 A1 * | 11/2007 | Popeil et al. | 99/407 |
| 2008/0041857 A1 * | 2/2008 | Johnson | 220/318 |
| 2008/0053984 A1 | 3/2008 | Gaynor et al. | |
| 2008/0083730 A1 | 4/2008 | Dolgov et al. | |
| 2009/0039071 A1 * | 2/2009 | Tynes et al. | 219/433 |
| 2010/0251902 A1 * | 10/2010 | Schandel et al. | 99/348 |

OTHER PUBLICATIONS

Mexican Office Action issued on Jul. 12, 2013 for Application No. MX/a/2011/001556.

* cited by examiner

COOKING APPARATUS AND METHOD

FIELD OF THE INVENTION

The present invention relates to a cooking apparatus and method, specifically to slow cookers.

BACKGROUND OF THE INVENTION

Slow cookers are used to heat food slowly or keep food warm over an extended period of time. In order to transport a slow cooker from a cooking location, e.g., a kitchen, to a serving location, e.g., a dining room, the food must be safely held in the cooker. Conventional slow cookers require transporting the entire apparatus from the cooking location to the serving location. This may be cumbersome when the cooker, especially when full of food, is heavy, or when there is little space or the serving location is far away, as in another building. Also, conventional slow cookers are limited to cooking the food in the cooker and the food must be transferred to another container for further cooking, e.g., on a stove. Moreover, conventional slow cookers require a great deal of energy in heat generation for enough heat to transfer to the food.

Accordingly, there is a need and desire to provide a slow cooker with an improved locking mechanism, improved energy use, and improved portability.

SUMMARY OF THE INVENTION

Embodiments of the present invention advantageously provide a slow cooker with an improved locking mechanism and improved portability.

An embodiment of the invention includes a cooking apparatus which includes an outer shell including a base, a heating element positioned inside the outer shell, and a thermally conducting liner removably located inside the outer shell over the heating element. The liner includes an annular flange, and a first integral handle including a first latch. The apparatus and method further includes a lid configured to be placed over the liner, the lid including a sealing ring at an outer edge of the lid, and a top surface, wherein the first latch is configured to contact the top surface of the lid to secure the lid to the annular flange of the liner.

Another embodiment of the invention includes a method of assembling a slow cooker, the method including placing a heating element inside an outer shell, the outer shell including a base, and placing a removable thermally conducting liner inside the outer shell over the heating element. The liner includes an annular flange with a thermally insulated material and an integral handle including a latch. The method further includes placing a lid over the liner, the lid including a top surface and a sealing ring at an outer edge of the lid, wherein the latch is capable of contacting the top surface of the lid to secure the lid to the annular flange of the liner.

Another embodiment of the invention includes a cooking apparatus including an outer shell including a base, means for heating positioned inside the outer shell, and a thermally conducting liner means for removably locating material to be heated inside the outer shell adjacent the means for heating. The liner means includes an annular flange and means for latching. The apparatus further includes means for covering configured to be placed over the liner means, the means for covering including a top surface and means for sealing at an outer edge of the means for covering, wherein the latching means is configured to contact the top surface of the means for covering to secure the means for covering to the annular flange.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures, wherein.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. The progression of processing steps described is an example; however, the sequence of steps is not limited to that set forth herein and may be changed as is known in the art, with the exception of steps necessarily occurring in a certain order.

Figure 1:
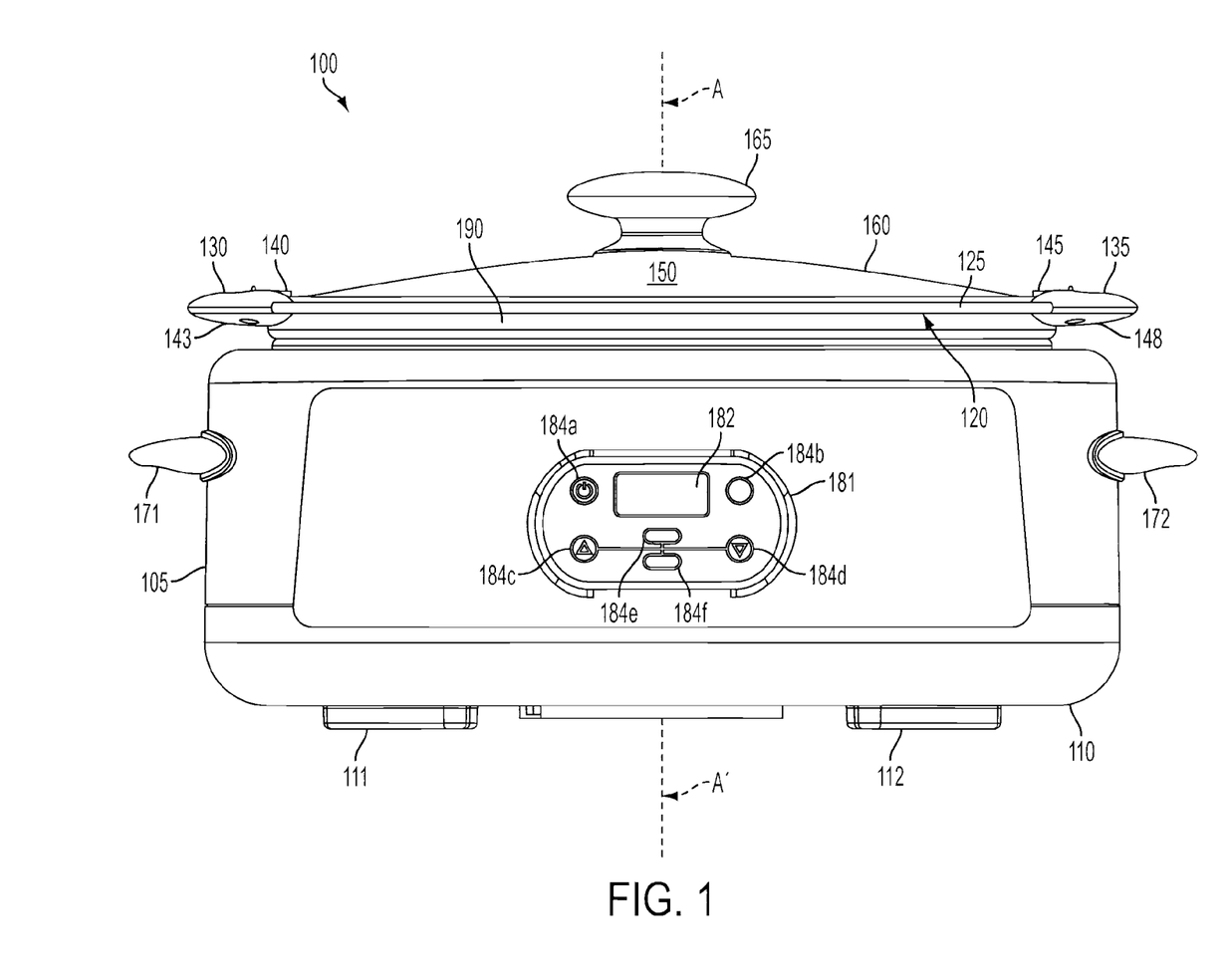
FIG. 1 is a front plan view of a cooking apparatus in accordance with an embodiment of the present invention.

The invention will now be described with reference to the drawing figures in which like reference numerals refer to like parts throughout. As depicted in FIG. 1, a cooking apparatus 100 includes an outer shell 105 which includes a base 110. The base 110 may sit on top of optional feet 111, 112. A liner 120 is provided within the outer shell 105 and includes an annular flange 125 and first and second integral handles 130, 135, each including a respective latch 140, 145. The cooking apparatus 100 further includes a lid 150 which may also have a lid handle 165 on a top surface 160. Each latch 130, 135 is configured to contact the top surface 160 of the lid 150 to secure the lid 150 to the annular flange 125 of the liner 120. The cooking apparatus 100 may have additional handles 171, 172 attached to an outside surface of the outer shell 105 for increased portability of the entire cooking apparatus 100.

A user interface 181 may be on a surface of the outer shell 105 for allowing a user to control the various functions of the cooking apparatus 100. The user interface 181 may include a display 182, which may be used, in one embodiment, as a timing device. Interface buttons, e.g., buttons 184a-f may be located on the user interface. Some examples of buttons may include a power button 184a, a temperature set button 184b, up and down buttons 184c, 184d, time set button 184e, and preset button 184f.

Because the handles 130, 135 are attached to the liner 120, the cooked food is more easily portable than in conventional slow cookers, since the outer shell 105 may be left behind and the carried portion is lighter and smaller than if the outer shell 105 and included heating element 115 were taken along. This is also convenient for bringing cooked food from a cooking location, e.g., a kitchen, to a serving location, e.g., a dining room. The removable liner 120 may be used alone as a serving container without needing to transfer the cooked food to another dish.

The liner 120 may be made of a material, such as aluminum, that may be placed on a stove for increased flexibility in cooking methods. Accordingly, the handles 130, 135 are preferably formed from a non-thermally conducting material, such as plastic, that can withstand cooking temperatures and not transfer heat to the hands of a user who may hold the liner 120 by the handles 130, 135. The use of metal for a liner decreases the amount of energy needed for cooking because the metal transfers heat easily to the contained food. It should be appreciated that any food-safe material with good thermal conduction may be used for the liner 120.

Other embodiments of the present invention include a retractable cord and a thermal insulation so that the outer surface of the cooking apparatus does not get hot. This may allow the user to easily transport the entire apparatus, for example, on his or her lap in a car. At the serving location, e.g., at the meeting, the food may be reheated before serving, for example, with a quick re-heat setting, described below with reference to FIG. 6A.

Figure 2:
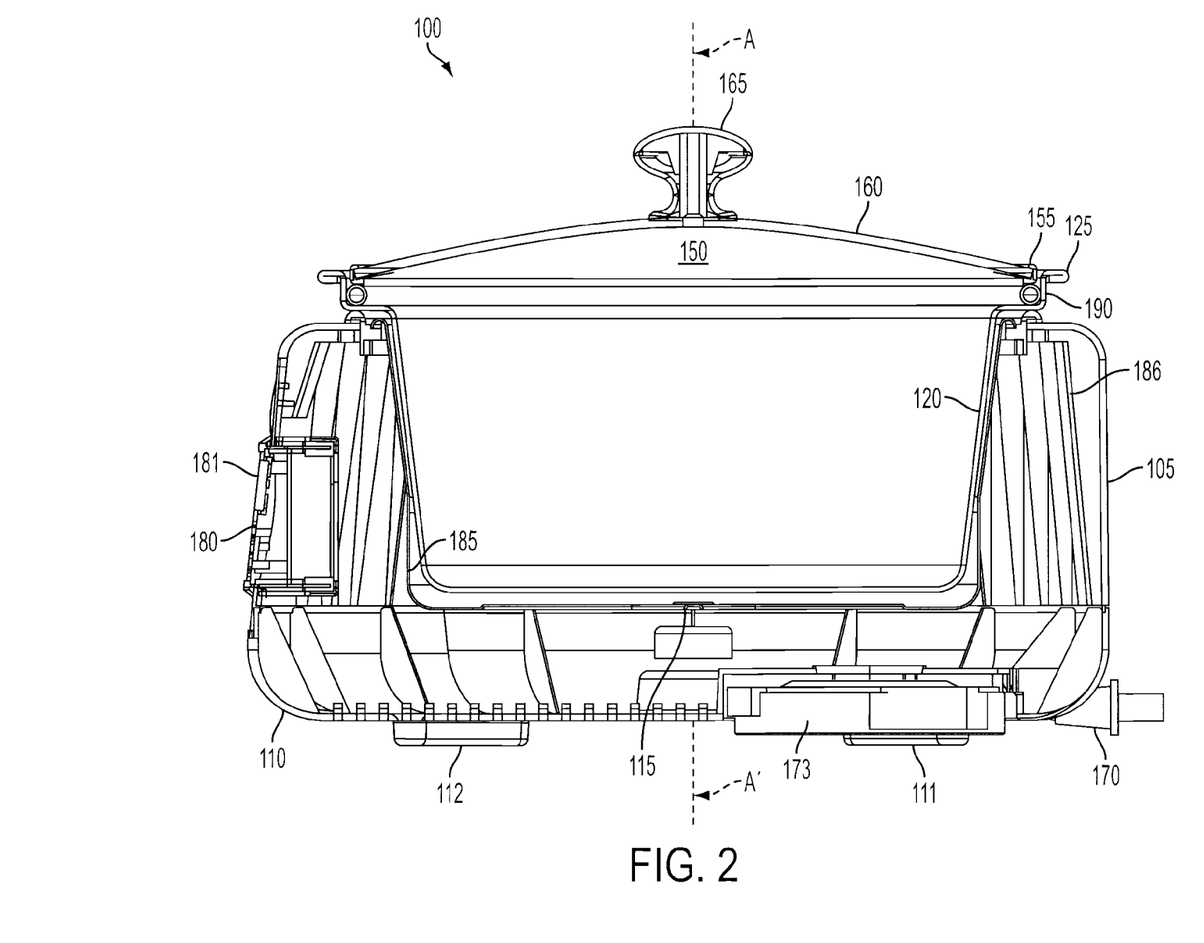
FIG. 2 is a cross sectional view of the FIG. 1 cooking apparatus taken along line A-A'.

FIG. 2 is a cross sectional view taken along line A-A' of the FIG. 1 cooking apparatus. Inside the outer shell 105 is a heating element 115 and a thermally conducting liner 120 removably located inside the outer shell 105 over the heating element 115. The lid 150 is configured to be placed over the liner 120 and may include a sealing ring 155 at an outer edge of the lid 150. The cooking apparatus 100 may further include a retractable power cord 170 as part of a cord retraction mechanism 173 which is extendable from the base 110. The portability is further improved by the cord retraction mechanism 173.

Embodiments of the present invention may be portable. In other words, a user should be able to easily transport the cooker from one location to another. For example, the user may need to prepare and cook the food at home, then bring the food to a meeting, e.g., at work, school, or a community function. Embodiments of the present invention allow this to be done by having handles with latches attached to the cooking liner so that the lid can be secured to the liner, and the food-containing liner transported from home without the base and heating parts. This could also allow the liner to be used as a cooking container by itself, e.g., on a stove or in an oven.

For example, a user may let food cook in the cooking apparatus 100 during the day while they are at work, go home and retrieve the entire cooking apparatus 100, retracting the retractable power cord 170, and drive to a PTA meeting. At the meeting location, the user may plug in the cooking apparatus 100, which can counteract the cooling of the food during the drive by reheating the food at a high cooking temperature, e.g., 350° F., then lower the temperature to a serving temperature, e.g., 190° F., and maintain the serving temperature without needing to transfer the food to a warming dish and without needing to use an additional warming device, such as sterno (fuel in a can) or a hot plate. The cooking apparatus 100 may also maintain the food at a warming temperature to kill potential bacteria without cooking the food, e.g., 140-160° F., and even raise the temperature to the serving temperature immediately before the food is to be eaten. The temperature may be set via any appropriate means. Nonlimiting examples of temperature setting means include measuring the temperature, e.g., with a thermocouple or thermistor, to adjust heat provided by the heating element 115 and providing a predetermined amount of power to the heating element 115 over a predetermined time. For example, the cooking apparatus 100 may control an amount of power, e.g., in watts, used for cooking.

As shown in FIG. 2, the cooking apparatus 100 may also have a printed circuit board (PCB) 180 which includes a controller board with a controller for controlling the heating element 115. The controller may be, for example, a microprocessor. The user interface 181, display 182, and each of the buttons 184a-f (FIG. 1) may be communicatively connected to the controller board for allowing the user to control the controller and for allowing the controller to provide information to the user.

The PCB may further include a memory for storing cooking information, such as preset recipe information. The presets may be accessed, for example, with the FIG. 1 preset button 184f. The user interface 181 may alert the user to add ingredients at predetermined times according to the preset recipe information. The user interface may include an audio signal generator which may be integrated in the PCB 180 for alerting the user, such as with a beeper, when the display 182 indicates that a predetermined period has passed. For example, the user may be notified that cooking is complete, ingredients must be added, or other information. It should be appreciated that the display 182, in addition to being a timing device, may also indicate other graphics or text including, for example, which ingredient to add, past, current, or future cooking temperatures, temperature monitor indicator, or other information. The display 182 may be a liquid crystal display (LCD) or any appropriate medium for transmitting electronically generated information to a user.

Some examples of information provided to a user may include having the user put in items that require a long cooking time, e.g., carrots, before shorter-timed items, e.g., tomatoes. The audio alert may have a volume adjustment so the user can set it quiet if they are nearby or louder to be able to hear the alert from another room. It may also be possible to have a remote alert sent wirelessly to another device, e.g., via Bluetooth to a Bluetooth-enabled device such as a cell phone or Blackberry device, or via wireless Internet to a Wi-Fi enabled device such as a laptop or cell phone.

Embodiments of the present invention could include the ability for the user to add additional recipe control algorithms to the cooking apparatus 100, such as by uploading the algorithms from a personal computer, removable disk drive, or other suitable device through a USB or other local data transfer interface. Further, the cooking apparatus 100 could include a way for users to develop and even share their own algorithms with others. The cooking apparatus 100 could verify that such new user-developed algorithms are physically safe to be used by the device; for instance, that they do not exceed upper limits of time or temperature.

Users may create such algorithms within the cooking apparatus 100, e.g., with PCB 180 or externally within other suitable computing equipment, and could use a custom programming language, a graphical user interface, or a combination of techniques. The cooking apparatus 100 could offer the user the ability to share or publish such creations by transmitting them to other nearby devices through wired or wireless local data transmission methods, or through readily available public data communication systems such as the Internet, the Public Switched Telephone Network, cell phone data or text streams, citizen's band packet radio, etc.

FIG. 2 shows that the cooking apparatus 100 may have an additional heat-conducting layer 185 disposed between the outer shell 105 and the liner 120 and a thermal insulating layer 186 disposed between the outer shell 105 and the heat-conducting inner layer 185 for reducing heat transfer from the heat-conducting layer 185 to the outer shell 105. There may also be insulation 190 connected to the annular flange 125 to provide additional protection for the user from heat transfer from the liner 120. The insulation 190 may be integrated with the handles 130, 135, and may cover the annular flange 125.

Embodiments of the present invention could include an operating mode intended to allow food to be safely cooked after first being stored within the cooking apparatus 100 until the conclusion of a substantial time delay, while actively mitigating the risk of food spoilage of the uncooked food. As described above, the cooking apparatus may maintain a bacteria-killing temperature until food is served. In addition, according to commonly-accepted safe food handling practices, uncooked perishable food should be maintained at refrigerated temperatures until just before the cooking process, and the time spent at room temperatures should typically be minimized.

There are many possible ways to initially maintain cold temperatures within the cooking apparatus 100. If the recipe to be prepared incorporates substantial water content, such as soups, stews, or beans, then an embodiment of the present invention may enable the user to fill the liner 120 with ice rather than water. The cooking process may be altered accordingly to compensate for this substitution. An embodiment of the present invention could assist the user in converting measurements of water into equivalent measurements of ice. Alternatively, the cooking apparatus 100 could be configured to have a separate vessel to accommodate ice or another cold material, or the cooking apparatus 100 could have an integrated insulating material, e.g., insulation 190, that could maintain cold temperatures after the entire device, or the liner 120, or the insulating material assembly alone, is first cooled, such as in a refrigerator or freezer.

Furthermore, the cooking apparatus 100 could be designed to withstand conditions of outdoor usage, such that, in sufficiently cold climates or weather conditions, the unit could simply be placed outside to utilize the existing prevailing conditions to maintain cool initial food temperatures. Moreover, the cooking apparatus 100 could include its own ability to actively chill its contents, which could be based on mechanical, thermoelectric, evaporative, or other principles. A combination of methods could also be used to extend the duration cold temperatures can be maintained without impacting the performance of other desired features.

Additionally, when undergoing a delayed-start cooking procedure requiring initially cold temperatures for food safety, the cooking apparatus 100 could also continuously monitor the temperature of the food vessel to verify the success in maintaining the required temperatures. If a failure in the cooking process is detected, the cooking apparatus 100 could warn the user and/or take various other types of corrective action. It could initiate the main cooking process earlier than originally intended to protect the food. Alternatively, the control algorithm could also protect users by actively rendering the potentially spoiled food inedible or undesirable for consumption, such as by canceling the cooking process.

An embodiment of the invention incorporating a feature for active cooling can also offer the ability to chill cooked food to allow its safe storage for an extended period of time thereafter. Units including active cooling could also implement recipes requiring particular heating and chilling cycles, or recipes requiring very precise temperature regulation, such as in preparing certain types of dough, batter, desserts, melted chocolate, coffee, candied fruits, or ice cream. Such units could even be configured to implement recipes for the production, from scratch, of items such as beer, wine, punch, cheese, tofu, miso, or tempeh.

Even without a desired delayed start, it is possible for food to become spoiled as a result of unexpected events, such as a power outage, a disconnected power cord, or an internal device failure. In this case, an embodiment of the present invention could include the ability, e.g., by the controller, to detect such types of situations, assess their severity, and provide warnings or possibly take similar corrective action by altering the cooking process. Such a feature could also simply continue the cooking process where it left off, if the loss of power is deemed to be of an insignificant duration, e.g., a few seconds or minutes, which may further be assessed based on the particular foods being used in a particular recipe and/or the amount the food has already been heated.

An embodiment of the invention could include an independent power source to support the ability for the controller to continuously manage its food spoilage mitigation strategy during an event involving the unexpected loss of the main power supply. This could be achieved through a power storage device such as a battery, a capacitor, or otherwise. Standby power could also be acquired via thermoelectric generation sourced from the residual heat or chill remaining within the main food compartment, perhaps using the same components that, during normal operation, would be intended to actively chill the food when required during delayed starts. Solar power may also be used, for example, if the cooking apparatus 100 is configured for outdoor conditions, as discussed above.

Embodiments of the present invention could include an additional independent controller device to monitor the cooker's performance and take corrective action, implement food spoilage mitigation strategies to ensure user and consumer safety, or simply take over control of the cooking apparatus 100 and continue the cooking process, even if the primary controller on the PCB 180 fails. These functions may also be provided by the primary controller on the PCB 180.

Figure 3:
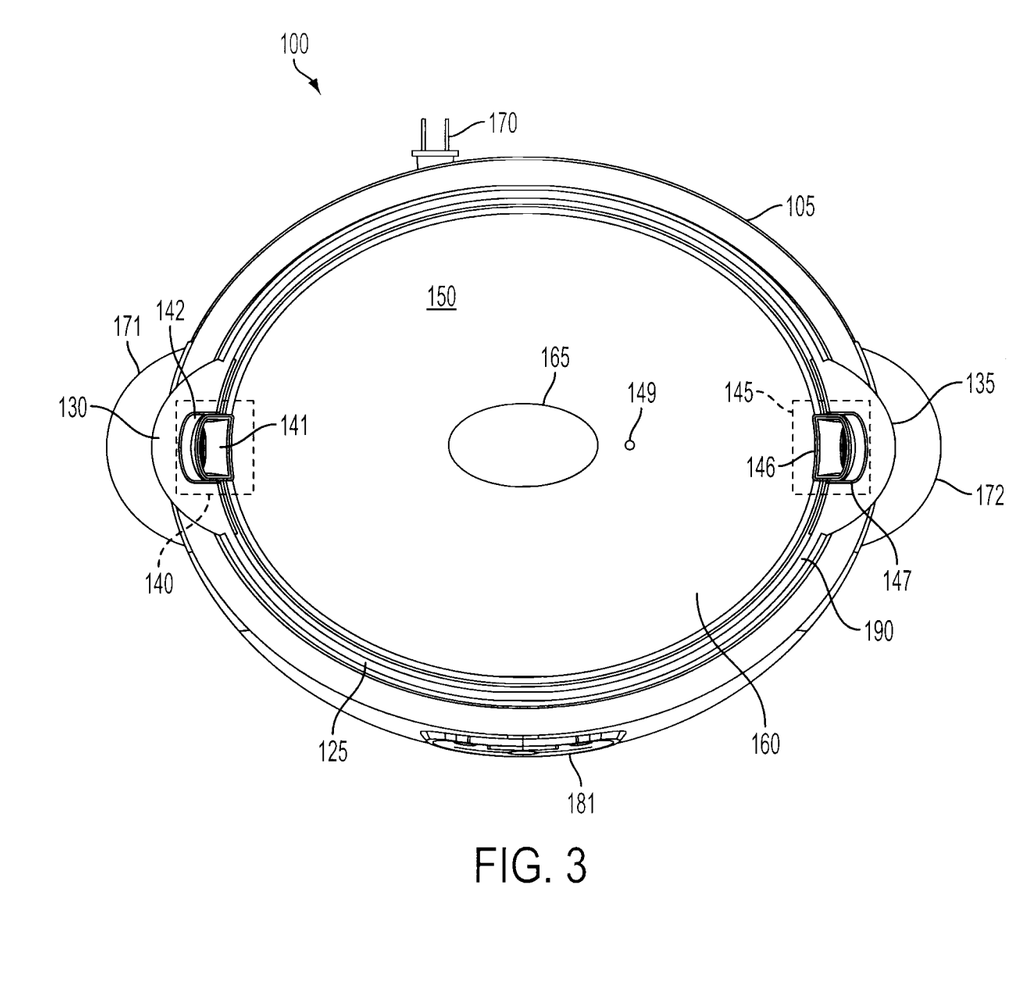
FIG. 3 is a top plan view of the FIG. 1 cooking apparatus in accordance with an embodiment of the present invention.

As shown in FIG. 3, each of the latches 140, 145 may include a respective latch actuator 141, 146 configured to be pushed over the lid 150 to secure the lid 150 to the annular flange 125. Each of the latches 140, 145 may further include a respective latch binder 142, 147 attached to a top side of each handle 130, 135 and latch actuator 141, 146 and also may include a respective latch base 143, 148 (shown in FIG. 1) attached to a bottom side of each handle 130, 135. The lid 150 may also include a pressure port 149 for allowing pressure to be adjusted within the cooking apparatus 100. For example, using a latching mechanism and the pressure port 149, a configurable containment system that would allow the device to internally build up a controlled level of steam can be provided and pressure as required for particular recipes.

The user interface 181 may allow a user to send instructions to the controller, such as, without limitation, entering new recipes, changing a cooking temperature, setting the display 182, selecting a preset recipe, or setting a predetermined cooking mode. The preset recipes may be user-defined, and may even be keyed to published recipes, for example, recipes provided in *Better Homes and Gardens* magazine.

Figure 4:
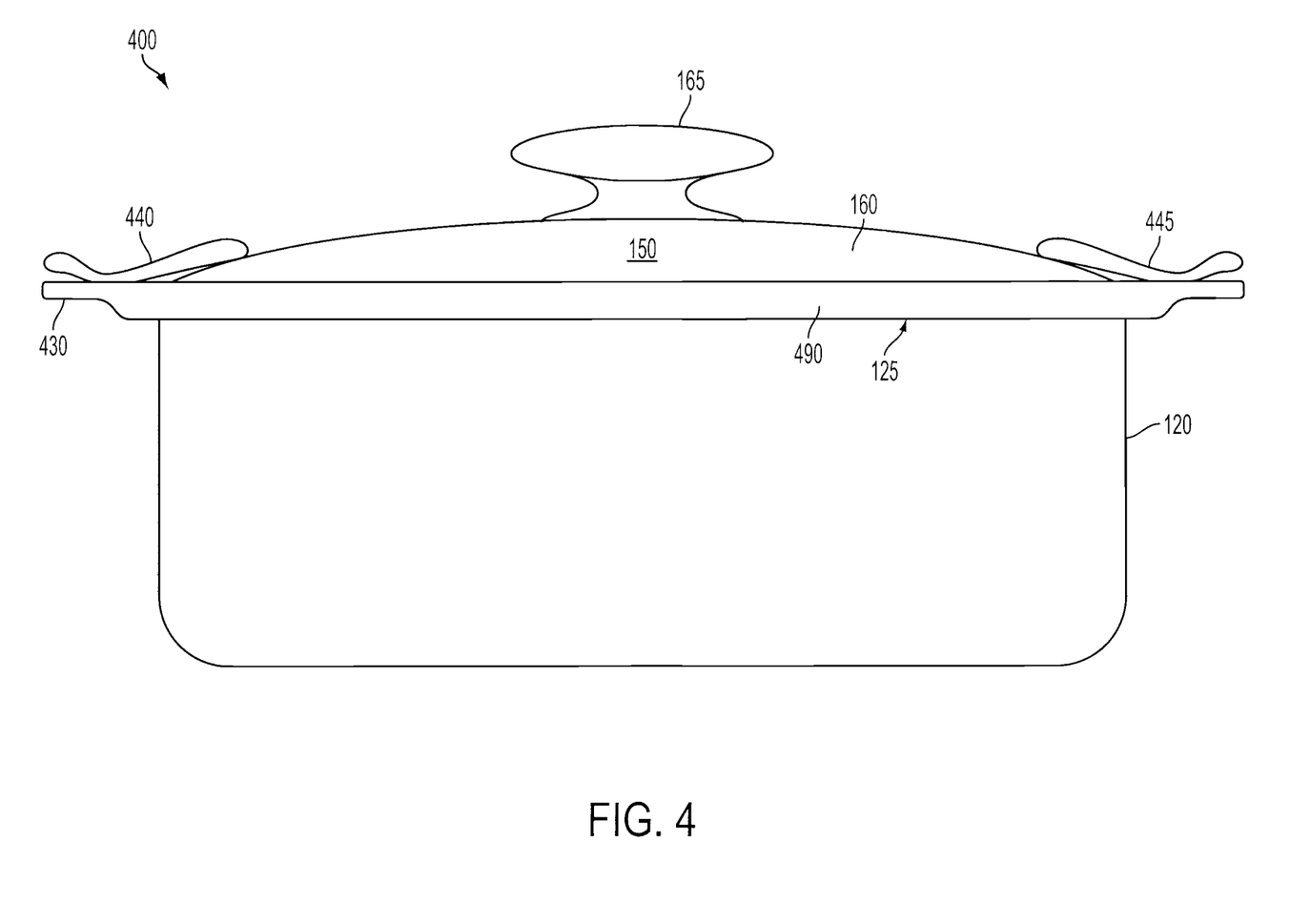
FIG. 4 is a rear plan view of a cooking apparatus in accordance with an embodiment of the present invention.

In an alternate embodiment, the cooking apparatus 400 shown in FIG. 4, the insulation 490, which may be similar to the insulation 490 around the annular flange 125, may be extended to function as a handle 430. Each latch 440, 445 may be a spring mechanism configured to clamp the latch 440, 445 over the lid 150 to secure the lid 150 to the annular flange 125. It should be noted that the handles 130, 135 of FIG. 1 may be used with the latches 440, 445 of FIG. 4 by attaching a latch 440, 445 to each handle 130, 135. The latches 440, 445 may also be rotatable about a pivot point to secure and release the lid 150.

Figure 5:
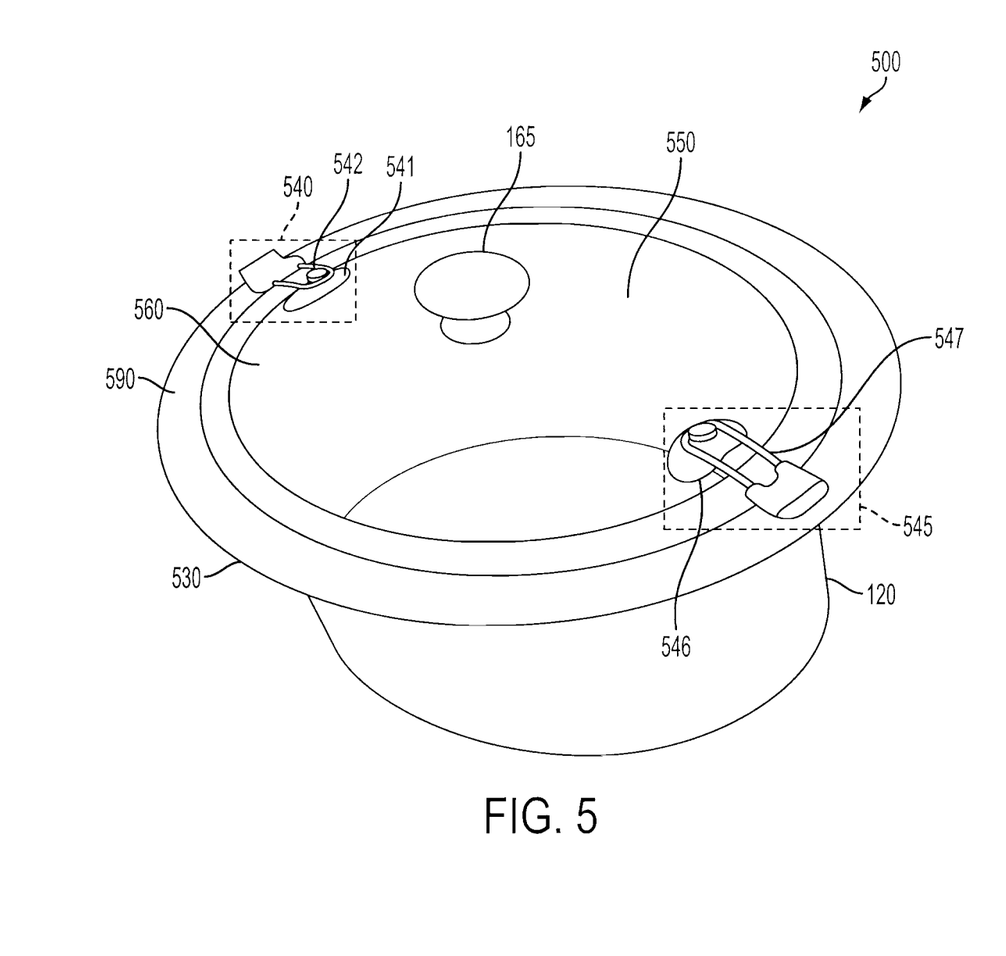
FIG. 5 is a top-rear perspective view of a cooking apparatus in accordance with an embodiment of the present invention.

FIG. 5 is a top-rear perspective view of a cooking apparatus 500 in accordance with an alternate embodiment of the present invention. The FIG. 5 lid 550 has at least two attached catches 541, 546, each of which corresponds to a respective U-latch 540, 545. Each U-latch 540, 545 includes a U-shaped clamp 542, 547 which can be attached to and detached from a respective catch 541, 546 to secure the lid 550 to the annular flange 530. In cooking apparatus 500, the insulation 590 over the annular flange of the liner 120 may be extended to function as a handle 530. It should be noted that the FIG. 1 handles 130, 135 can be used with the U-latches 540, 545. It should also be appreciated that a single U-latch 540 and catch 541 may be used, for example, when a hinge or other attachment mechanism is used on an opposing side of the lid 550, or if another type of latch is used on an opposing side of the lid 550.

Figure 6A:
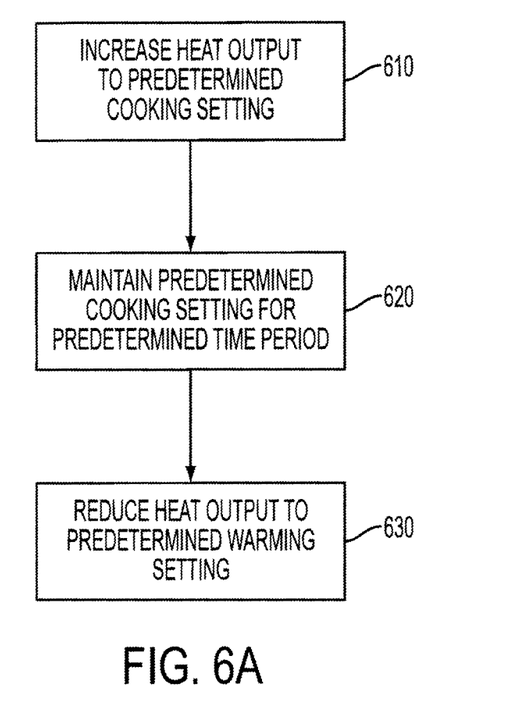
FIGS. 6A-6B are flow charts of predetermined cooking modes in accordance with an embodiment of the present invention.

Some nonlimiting examples of predetermined cooking modes include quick re-heat, soak and cook, and warming. The quick re-heat mode may be used, for example, when the food has already been cooked, but is then taken to another location or must sit around cooling before being eaten. As shown in FIG. 6A, when the predetermined cooking mode is a quick re-heat mode, the controller is configured to instruct the heating element 115 to increase a heat output to a predetermined cooking temperature, e.g., 350° F. (step 610), maintain the predetermined cooking temperature for a predetermined time period (step 620), e.g., 10 minutes, then reduce the heat output to a predetermined warming temperature, e.g., 140-160° F. (step 630). The heat output may be increased, e.g., by controlling an amount of power provided to the heating element 115.

Figure 6B:
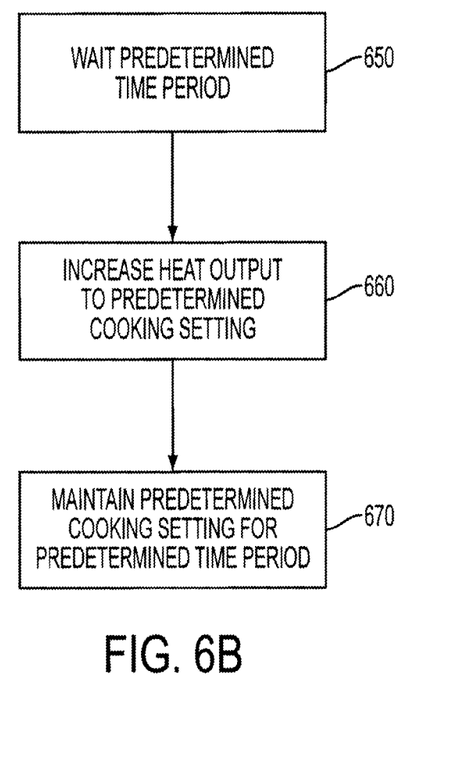

The soak and cook mode is used, for example, when cooking beans or other foods that must sit at room temperature, or a low non-cooking temperature, then be brought up to cooking temperature later. As shown in FIG. 6B, when the predetermined cooking mode is a soak and cook mode, the controller is configured to instruct the heating element 115 to wait for a predetermined time (step 650), then to increase a heat output to a predetermined cooking temperature (step 660). The controller may optionally further instruct the heating element 115 to maintain the predetermined cooking temperature for a predetermined time period (step 670), if required.

Figure 7:
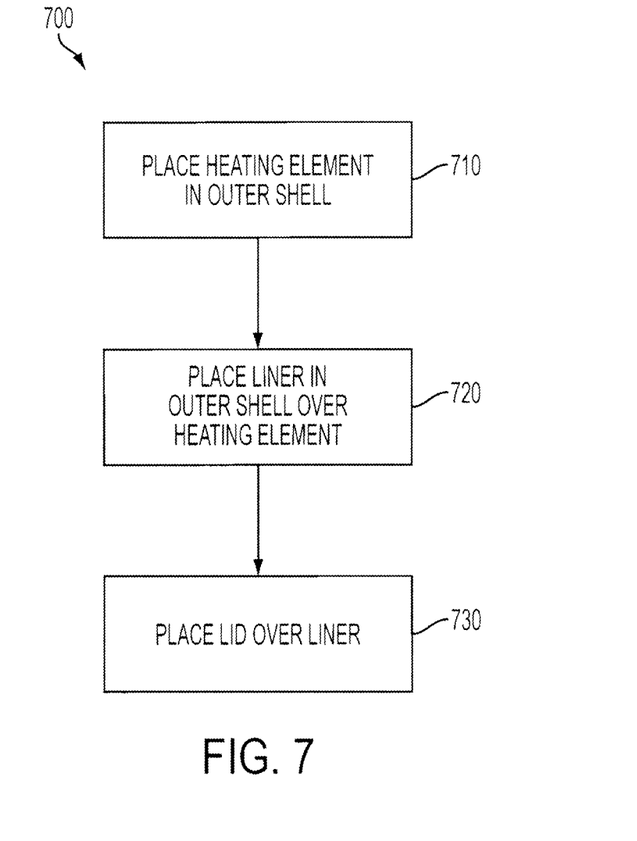
FIG. 7 is a flow chart of a method of assembling a cooking apparatus in accordance with an embodiment of the present invention.

FIG. 7 is a flow chart of a method of assembling a cooking apparatus in accordance with the present invention. A method 700 of assembling a slow cooker includes placing a heating element inside an outer shell (step 710), and placing a removable thermally conducting liner inside the outer shell over the heating element (step 720). The liner includes an annular flange with a thermally insulated material, and an integral handle including a latch. The method 700 further includes placing a lid over the liner (step 730), the lid including with a top surface and a sealing ring at an outer edge of the lid. The outer shell includes a base in which a retractable power cord may be placed. The latch is capable of contacting the top surface of the lid to secure the lid to the annular flange of the liner. An embodiment of a cooking apparatus may be produced by the method 700.

Figure 8:
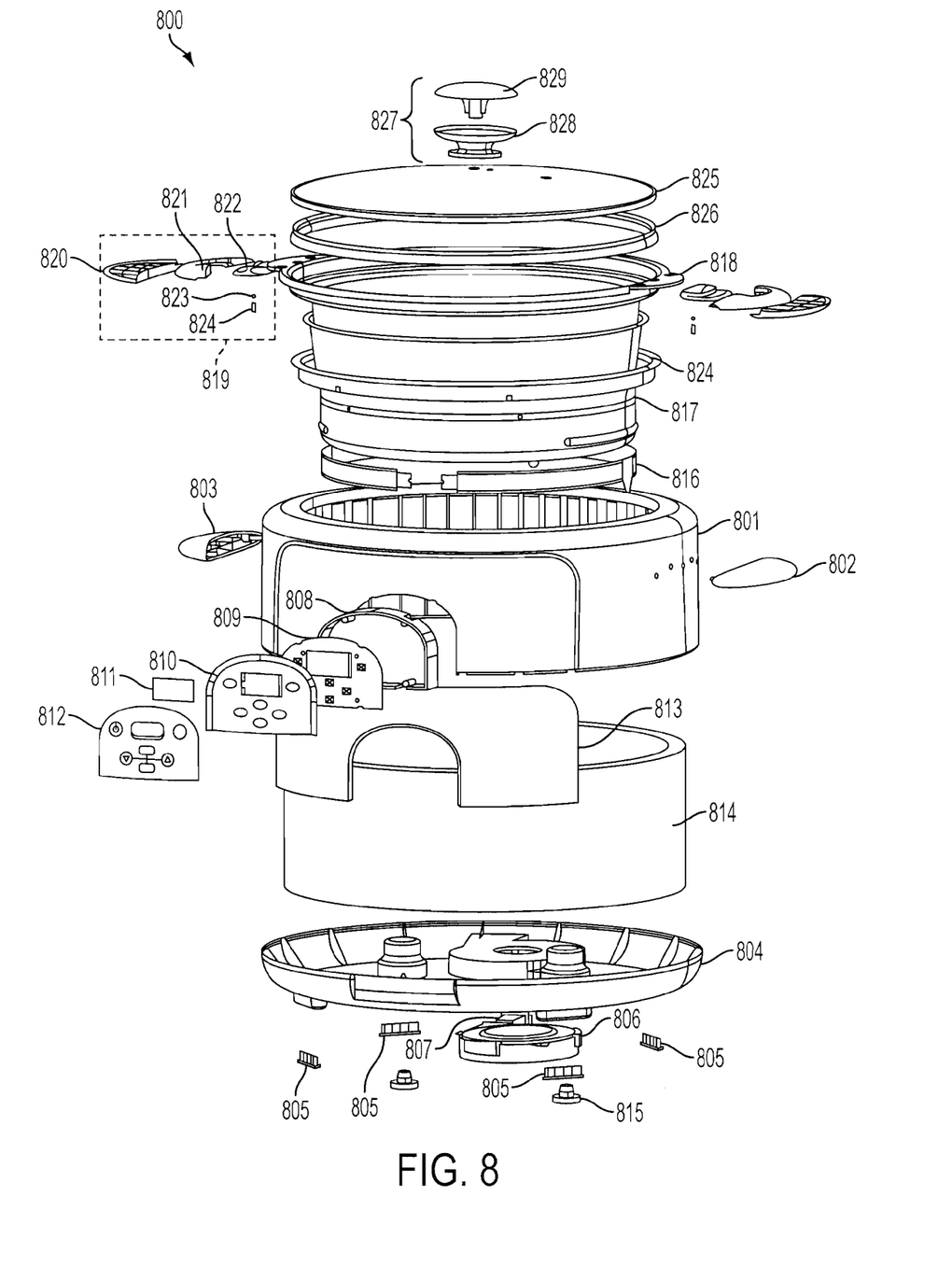
FIG. 8 is an exploded view of a cooking apparatus in accordance with an embodiment of the present invention.

FIG. 8 is an exploded view of a cooking apparatus in accordance with an embodiment of the present invention. The cooking apparatus 800 may include an outer shell 801, first and second body handles 802, 803 attached to the outer shell 801, a base 804, and feet 805. The feet 805 may be formed of a nonskid material, such as rubber or silica gel. The cooking apparatus 800 may further include a cord retraction mechanism 806 which includes a retractable power cord 807.

A printed circuit board (PCB) cover 808 may cover a PCB 809. A PCB panel 810 may be disposed over the PCB for providing protection and button connections to the PCB 809. A transparent window 811 may cover a display portion of the PCB 809. A panel cover 812 over the PCB panel 810 may have text and/or graphics that indicate the various functions of the buttons to a user. A front plate 813 may be located on the outer surface of the outer shell 801 and surround the panel cover 812 and provide additional insulation and/or decoration. Although shown on a front surface of the outer shell 801, the front plate may extend around the entire outer surface of the outer shell 801 or portion thereof.

Inside the outer shell 801 of the cooking apparatus 800 may be a thermal insulator 814. The thermal insulator 814 may prevent thermal transfer from the heating or heated material inside the cooking apparatus 800 to the outer shell 801 and a person holding the cooking apparatus 800. The outer shell 801 may be hollow, allowing air in a space between the outer shell 801 and the thermal insulator 814 for additional insulation. In one embodiment, the thermal insulator 814 has a thickness of 25 mm. The thermal insulator 814 may be placed over a fixed block 815, which protrudes through the base 804. A heating element 816 may be inside the thermal insulator 814 for heating a cooking liner 817. The heating element may be, for example, a resistive heating device having operation parameters of, e.g., 120 V, 60 Hz, and 300 W. Other operating parameters are usable based on desired heat speeds, country- or location-specific available power supplies (e.g., wall outlet AC power), or other relevant parameters.

Inside the cooking liner 817 may be a metal liner 818 having an annular flange. The metal of the metal liner 818 may be, for example, any metal that does not easily corrode or interact with food, e.g., aluminum. Attached to the metal liner 818 may be at least one liner handle 819. The liner handle 819 may include a latch base 820 and a latch binder 821 for securing a latch 822. A steel ball 823 and spring 824 may also be included in the liner handle 819 for use in operating the latch 822, explained below. A heating insulation 824 may be attached to the annular flange of the metal liner 818 to keep a user from injuring themselves on a potentially hot liner edge. Embodiments may also include a non-stick coating on the cooking surface to aid in cleaning the cooking apparatus 800. Non-stick coatings may include, for example, ceramic, and enamel, or polytetrafluoroethylene (PTFE), which is also known by its DuPont-owned brand name Teflon®.

A lid 825 may be placed over the top of the cooking apparatus 800. In one embodiment of the present invention, the lid is preferably made of an insulating material, such as glass, to keep heat inside the cooking apparatus 800. The aforementioned steel ball 823 and spring 824 may provide tension so that, when the latch 822 is pushed by a user over the lid 825, the latch 822 remains over the lid until force is applied to move the latch 822 off of the lid. The lid 825 may include a sealing ring 826 around the perimeter of the lid 825 and a lid handle 827 on a top surface of the lid 825. The lid handle 827 may include a lid handle base 828 and a lid handle cover 829.

An embodiment of the invention could incorporate detecting and measuring the weight or volume of the contained food. This can allow the device to implement a user alert to assist with measuring ingredients, liquids, ice, or water as the items are directly deposited into the device, avoiding the need to first use a separate measuring procedure or apparatus. This would be a convenient potential feature for equating ice and water measurements as discussed before. The measurement could also be consulted during the cooking process to judge how much water content has been expelled, allowing for quality results when cooking items such as grains, rice, couscous, or for preparing jellies and jams. The measurement could also be used to assist with serving food in equal or controlled individual portions.

The cooking apparatus, having constructions as described above and as operated as described herein, may be constructed using sustainable methods and materials having minimal environmental impact. For example, the cooking apparatus may use lower power consumption than conventional slow cookers and/or have a larger percentage (e.g., 25%) of power input being used directly for cooking than with conventional slow cookers. The plastics used, e.g., in the outer shell 105, may be biodegradable. Various parts may be recyclable or made from recycled materials.

Embodiments of the present invention could be manufactured in accordance with the Restriction of the Use of Certain Hazardous Substances in Electrical and Electronic Equipment Regulations of the European Union (RoHS Regulations), which would reassure customers and allow the cooking apparatus to be offered for sale in locales so governed. Embodiments of the present invention can be made such that units made for sale in the State of California are not required to display warning labels in accordance with California's Proposition 65.

An embodiment of the present invention could provide a self-cleaning function to occasionally clear dirt or debris from components such as the heating element assembly. This may be combined, for example, with the above-discussed water or ice containing feature.

The processes and devices in the above description and drawings illustrate examples of only some of the methods and devices that could be used and produced to achieve the objects, features, and advantages of embodiments described herein. Thus, they are not to be seen as limited by the foregoing description of the embodiments, but only limited by the appended claims. Any claim or feature may be combined with any other claim or feature within the scope of the invention.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A cooking apparatus comprising:
   an outer shell comprising a base;
   a heating element positioned inside the outer shell;
   a thermally conducting liner removably located inside the outer shell over the heating element, the liner comprising:
      an annular flange; and
      a first integral handle comprising a first latch; and
   a lid configured to be placed over the liner, the lid comprising:
      a sealing ring at an outer edge of the lid;
      a top surface; and
      a second integral handle comprising a second latch, the second latch comprising a latch actuator configured to be pushed over the lid,
   wherein the first latch is configured to contact the top surface of the lid to secure the lid to the annular flange of the liner.

2. The cooking apparatus of claim 1, wherein the first latch comprises a latch actuator configured to be pushed over the lid to secure the lid to the annular flange.

3. The cooking apparatus of claim 2, wherein the first latch comprises:
   a latch binder attached to a top side of the integral first handle and the latch actuator; and
   a latch base attached to a bottom side of the integral first handle.

4. The cooking apparatus of claim 1, further comprising a retractable power cord which is extendable from the base.

5. The cooking apparatus of claim 1, further comprising a controller for controlling the heating element.

6. The cooking apparatus of claim 5, wherein the outer shell further comprises a user interface communicatively connected to the controller.

7. The cooking apparatus of claim 6, wherein the user interface comprises a timing device.

8. The cooking apparatus of claim 7, further comprising a memory for storing cooking information.

9. The cooking apparatus of claim 8, wherein the cooking information comprises preset recipe information.

10. The cooking apparatus of claim 9, wherein the user interface is configured to alert a user to add ingredients at predetermined times according to the preset recipe information.

11. The cooking apparatus of claim 9, wherein the user interface further comprises an audio signal generator for alerting a user.

12. The cooking apparatus of claim 11, wherein the audio signal generator comprises a beeper.

13. The cooking apparatus of claim 9, wherein the user interface is configured to allow a user to send instructions to the controller.

14. The cooking apparatus of claim 9, wherein the controller is configured to operate in a predetermined cooking mode.

15. The cooking apparatus of claim 14, wherein, when the predetermined cooking mode is a quick re-heat mode, the heating element is configured to:
  increase a heat output to a predetermined cooking setting;
  maintain the predetermined cooking setting for a predetermined time period; and
  reduce the heat output to a predetermined warming setting.

16. The cooking apparatus of claim 14, wherein, when the predetermined cooking mode is a soak and cook mode, the heating element is configured to wait for a predetermined time, then to increase a heat output to a predetermined cooking setting.

17. The cooking apparatus of claim 1, further comprising third and fourth handles attached to an outside surface of the outer shell.

18. The cooking apparatus of claim 17, further comprising a fifth handle attached to the top surface of the lid.

19. The cooking apparatus of claim 1, further comprising:
  a heat-conducting layer disposed between the outer shell and the liner; and
  a thermal insulating later disposed between the outer shell and the heat-conducting inner layer for reducing heat transfer from the heat-conducting layer to the outer shell.

20. The process of claim 19, further including a second integral handle also comprising a latch, wherein each latch is capable of contacting the top surface of the lid to secure the lid to the annular flange of the liner.

21. The cooking apparatus of claim 1, further comprising insulation connected to the annular flange.

22. The cooking apparatus of claim 1, wherein at least 25% of power input is used directly for cooking.

23. A cooking apparatus comprising:
  an outer shell comprising a base;
  a heating element positioned inside the outer shell;
  a thermally conducting liner removably located inside the outer shell over the heating element, the liner comprising:
    an annular flange; and
    a first integral handle comprising a first latch; and
  a lid configured to be placed over the liner, the lid comprising:
    a sealing ring at an outer edge of the lid;
    a top surface; and
    a second integral handle comprising a second latch, the second latch comprising a spring configured to clamp the latch over the lid;
  wherein the first latch is configured to contact the top surface of the lid to secure the lid to the annular flange of the liner, wherein the first latch comprises a spring configured to clamp the latch over the lid to secure the lid to the annular flange.

24. A cooking apparatus comprising:
  an outer shell comprising a base;
  a heating element positioned inside the outer shell;
  a thermally conducting liner removably located inside the outer shell over the heating element, the liner comprising:
    an annular flange; and
    a first integral handle comprising a first latch; and
  a lid configured to be placed over the liner, the lid comprising:
    a sealing ring at an outer edge of the lid; and
    a top surface, and
    a second integral handle comprising a second latch, the second latch comprising a rotatable pivot configured to clamp the latch over the lid;
  wherein the first latch is configured to contact the top surface of the lid to secure the lid to the annular flange of the liner, wherein the first latch comprises a rotatable pivot configured to clamp the latch over the lid to secure the lid to the annular flange.

25. A cooking apparatus comprising:
  an outer shell comprising a base;
  a heating element positioned inside the outer shell;
  a thermally conducting liner removably located inside the outer shell over the heating element, the liner comprising:
    an annular flange; and
    a first integral handle comprising a first latch; and
  a lid configured to be placed over the liner, the lid comprising:
    a sealing ring at an outer edge of the lid;
    a top surface; and
    a second integral handle comprising a second latch,
  wherein the lid further comprises a second catch; and the second latch comprises a U-shaped clamp removably attached to the second catch,
  wherein the first latch is configured to contact the top surface of the lid to secure the lid to the annular flange of the liner, and
  wherein: the lid further comprises a first catch; and the first latch comprises a U-shaped clamp removably attached to the first catch to secure the lid to the annular flange.

26. A method of assembling a cooking apparatus, the method comprising:
  placing a heating element inside the outer shell;
  placing a removable conducting liner inside an outer shell over the heating element, the outer shell comprising a base, and the liner comprising:
    an annular flange with a thermally insulated material; and
    an integral handle comprising a latch;
    a second handle comprising a second latch; and
  placing a lid over the liner, the lid comprising:
    a top surface; and
    a sealing ring at an outer edge of the lid,
  wherein each latch is capable of contacting the top surface of the lid to secure the lid to the annular flange of the liner.

27. The method of claim 26, wherein the latch is further configured to be pushed outward over the lid to secure the lid to the annular flange.

28. The method of claim 26, wherein the latch is further configured to clamp over the lid to secure the lid to the annular flange with a spring.

29. The method of claim 26, further comprising electrically connecting a retractable power cord to the heating element, the power cord being extendable from the base.

30. The method of claim 26, further comprising a timing device.

31. The method of claim 30, further comprising a memory for storing cooking information.

32. A cooking apparatus comprising:
  an outer shell comprising a base;
  means for heating positioned inside the outer shell;
  a thermally conducting liner means for removably locating material to be heated inside the outer shell adjacent the means for heating, the liner means comprising:
    an annular flange; and
    means for latching; and means for covering configured to be placed over the liner means, the means for covering comprising:
a top surface; and
means for sealing at an outer edge of the means for covering,
wherein the latching means is configured to contact the top surface of the means for covering to secure the means for covering to the annular flange,
wherein the means for latching includes two handles each with a latching means configured to contact the top surface of the means for covering.

33. A cooking apparatus comprising:
an outer shell comprising a base;
a heating element positioned inside the outer shell;
a thermally conducting liner removably located inside the outer shell over the heating element, the liner comprising:
an annular flange; and
a first integral handle comprising a first latch; and
a lid configured to be placed over the liner, the lid comprising:
a sealing ring at an outer edge of the lid;
a top surface; and
a second handle and second latch on the liner and the second latch is configured to contact the top surface of the lid to secure the lid to the annular flange of the liner,
wherein the first latch is configured to contact the top surface of the lid to secure the lid to the annular flange of the liner.

* * * * *